United States Patent
Mullen et al.

(10) Patent No.: US 9,435,219 B2
(45) Date of Patent: Sep. 6, 2016

(54) GAS TURBINE INLET SYSTEM AND METHOD

(75) Inventors: Michael Corey Mullen, Greenville, SC (US); Rex Allen Morgan, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 1077 days.

(21) Appl. No.: 13/454,533

(22) Filed: Apr. 24, 2012

(65) Prior Publication Data

US 2013/0276458 A1    Oct. 24, 2013

(51) Int. Cl.

| F01D 17/14 | (2006.01) |
|---|---|
| F01D 17/16 | (2006.01) |
| F02C 7/057 | (2006.01) |
| F02C 9/20 | (2006.01) |

(52) U.S. Cl.
CPC .......... *F01D 17/146* (2013.01); *F01D 17/162* (2013.01); *F02C 7/057* (2013.01); *F02C 9/20* (2013.01); *F05D 2270/08* (2013.01); *F05D 2270/3011* (2013.01); *Y02T 50/677* (2013.01)

(58) Field of Classification Search
CPC ...... F01D 17/146; F01D 17/162; F02C 9/20; F05D 2270/3011
USPC ................................. 137/15.1, 15.2
See application file for complete search history.

(56) References Cited

U.S. PATENT DOCUMENTS

| 3,123,283 | A | * | 3/1964 | Leis | 415/115 |
|---|---|---|---|---|---|
| 3,611,724 | A | * | 10/1971 | Kutney | 60/226.1 |
| 3,975,900 | A | * | 8/1976 | Pfefferle | F23R 3/26 60/39.23 |
| 4,178,754 | A | * | 12/1979 | Earnest | F01K 23/10 60/39.181 |
| 6,027,304 | A | * | 2/2000 | Arar | F02C 7/045 415/116 |
| 6,877,307 | B2 | * | 4/2005 | Ryan et al. | 60/39.281 |
| 7,032,388 | B2 | * | 4/2006 | Healy | 60/772 |
| 7,926,256 | B2 | * | 4/2011 | Draper | F02C 1/005 60/39.12 |
| 8,796,874 | B2 | | 8/2014 | Hoffmann et al. | |
| 2009/0053036 | A1 | | 2/2009 | Crawley et al. | |
| 2010/0175385 | A1 | | 7/2010 | Plant et al. | |

FOREIGN PATENT DOCUMENTS

| CN | 101657963 A | 2/2010 |
|---|---|---|
| JP | 1113486 A | 1/1999 |

OTHER PUBLICATIONS

Unofficial English Translation of Chinese Office Action issued in connection with corresponding CN Application No. 201310146078.X on Oct. 8, 2015.

* cited by examiner

*Primary Examiner* — Phutthiwat Wongwian
*Assistant Examiner* — Stefan Ibroni
(74) *Attorney, Agent, or Firm* — Ernest G. Cusick; Frank A. Landgraff

(57) ABSTRACT

A gas turbomachine inlet system includes a duct member having an inlet portion fluidically coupled to an outlet portion through an intermediate portion. The inlet portion, outlet portion, and intermediate portion define a fluid flow zone. A throttling system is arranged in the duct member at one of the inlet portion, outlet portion and intermediate portion. The throttling system is configured and disposed to selectively establish a pressure drop through the fluid flow zone. A method of controlling inlet pressure drop through an inlet system for a gas turbomachine is also described herein.

17 Claims, 4 Drawing Sheets

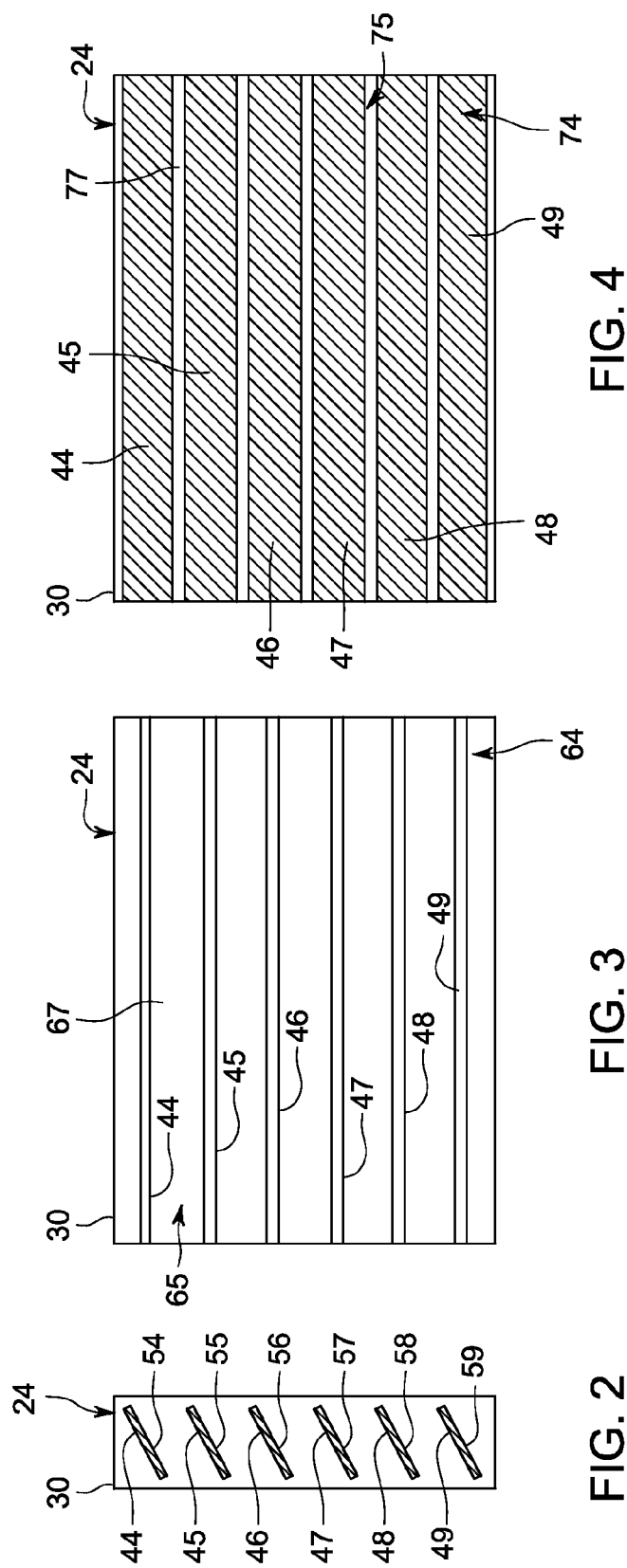

_US 9,435,219 B2_

GAS TURBINE INLET SYSTEM AND METHOD

BACKGROUND OF THE INVENTION

The subject matter disclosed herein relates to the art of turbomachines and, more particularly, to an inlet system for a gas turbomachine.

In a turbomachine, air is passed into an inlet of a compressor. The air is passed through various stages of the compressor to form a compressed airflow. A portion of the compressed airflow is passed to a combustion assembly and another portion of the compressed airflow is passed to a turbine portion and used for cooling. In the combustion assembly, the compressed airflow is mixed with fuel and combusted to form a high temperature gas stream and exhaust gases. The high temperature gas stream is channeled to the turbine portion via a transition piece. The transition piece guides the high temperature gas stream toward a hot gas path of the turbine portion. The high temperature gas stream expands through various stages of the turbine portion converting thermal energy to mechanical energy that rotates a turbine shaft. The turbine portion may be used in a variety of applications including providing power to a pump, an electrical generator, a vehicle, or the like.

BRIEF DESCRIPTION OF THE INVENTION

According to one aspect of the exemplary embodiment, a gas turbomachine inlet system includes a duct member having an inlet portion fluidically coupled to an outlet portion through an intermediate portion. The inlet portion, outlet portion, and intermediate portion define a fluid flow zone. A throttling system is arranged in the duct member at one of the inlet portion, outlet portion, and intermediate portion. The throttling system is configured and disposed to selectively establish a pressure drop through the fluid flow zone.

According to another aspect of the exemplary embodiment, a method of controlling inlet pressure drop through an inlet system for a gas turbomachine includes establishing an operating mode for the gas turbomachine, and adjusting a throttling system provided in a duct member of the inlet system to control inlet pressure to the gas turbomachine based on the operating mode.

According to yet another aspect of the exemplary embodiment, a gas turbomachine includes a compressor portion having a compressor inlet, a turbine portion mechanically coupled to the compressor portion, a combustor assembly fluidically connected to the compressor portion and the turbine portion, and an inlet system fluidically connected to the compressor inlet. The inlet system includes a duct member having an inlet portion fluidically coupled to an outlet portion through an intermediate portion. The inlet portion, outlet portion, and intermediate portion define a fluid flow zone. A throttling system is arranged in the duct member at one of the inlet portion, outlet portion, and intermediate portion. The throttling system is configured and disposed to selectively establish a pressure drop through the fluid flow zone These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is a side view of a throttling system in accordance with an aspect of the exemplary embodiment;

FIG. 3 is a plan view of the throttling system of FIG. 2 shown in a first, low pressure drop position;

FIG. 4 is a plan view of the throttling system of FIG. 2 shown in a second, high pressure drop position;

The detailed description explains embodiments of the invention, together with advantages and features, by way of example with reference to the drawings.

DETAILED DESCRIPTION OF THE INVENTION

Figure 1:
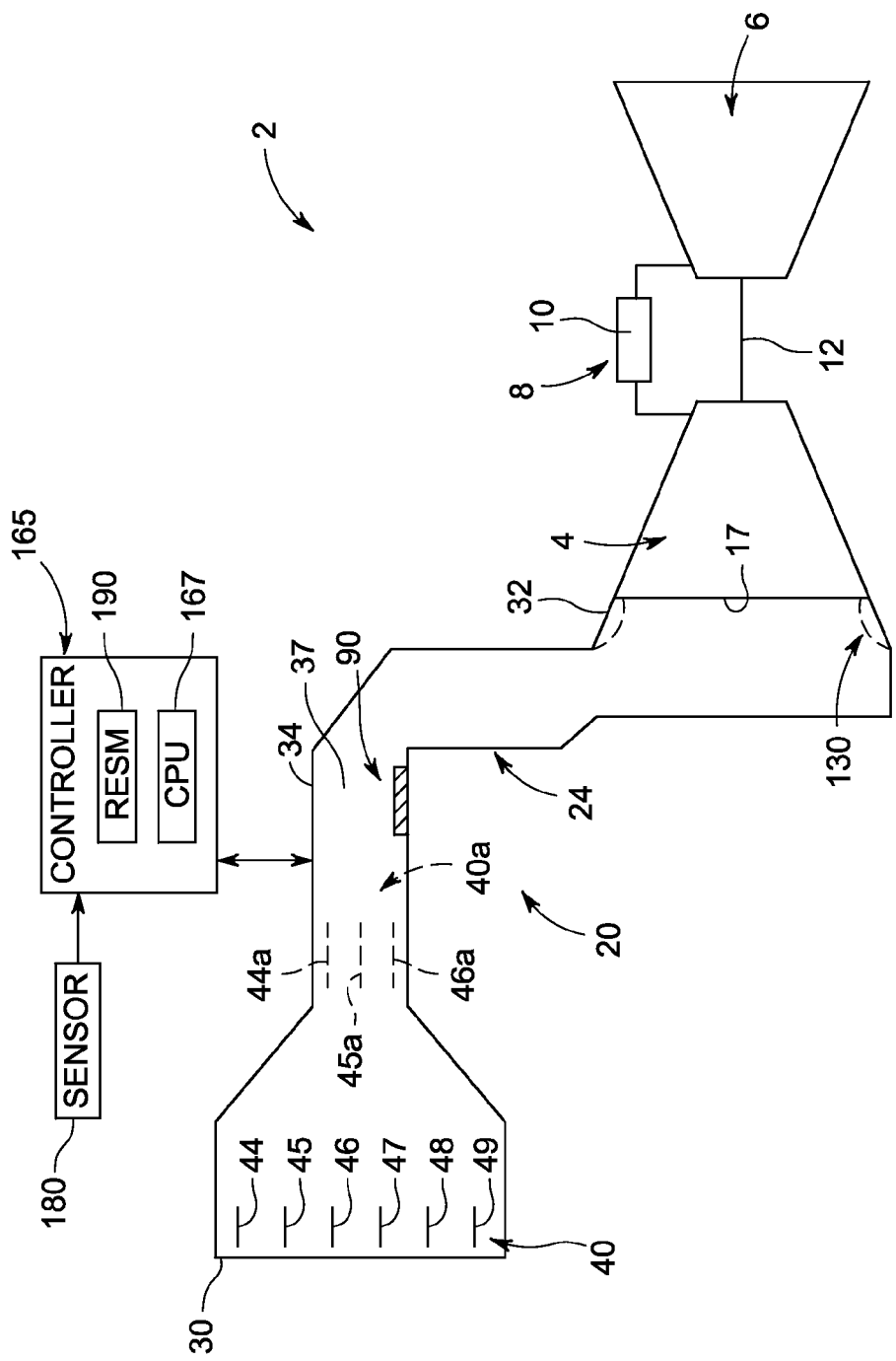
FIG. 1 is a schematic view of a gas turbomachine including an inlet system having a throttling system in accordance with an exemplary embodiment.

A gas turbomachine in accordance with an exemplary embodiment is illustrated generally at 2 in FIG. 1. Gas turbomachine 2 includes a compressor portion 4 fluidically connected to a turbine portion 6 through a combustor assembly 8. Combustor assembly 8 includes a plurality of combustors, one of which is indicated at 10. Compressor portion 4 is also mechanically linked to turbine portion 6 through a common compressor/turbine shaft 12. Compressor portion 4 is shown to include a compressor inlet 17 that is coupled to an inlet system 20. Inlet system 20 includes a duct member 24 having an inlet portion 30 that extends to an outlet portion 32 through an intermediate portion 34. Inlet portion 30, outlet portion 32, and intermediate portion 34 collectively define a fluid flow zone 37. Inlet system 20 delivers a flow of air to compressor inlet 17.

Air passes through inlet system 20 into compressor inlet 17. The air enters, passes through, and is compressed by compressor portion 4 forming compressed gases. A first portion of the compressed gases flow into various portions of turbine portion 6 for cooling purposes. A second portion of the compressed gases pass into combustor assembly 8. The second portion of compressed gases mixes with a fuel to form a combustible fluid. The combustible fluid is combusted within combustor 10 forming products of combustion that are passed into turbine portion 6. The products of combustion expand through turbine portion 6 transforming thermal energy into mechanical energy that is used to drive, for example a generator, a pump, or to power a vehicle such as a locomotive or aircraft. The products of combustion include emissions that are subject to various governmental restrictions. The amount of the emission in the products of combustion depends upon operating parameters of gas turbomachine 2. For example, at lower power settings, less heat is produced causing emissions, such as carbon monoxide (CO) levels to increase. It is however desirable to operate at lower power settings during various periods. In order to reduce emissions at lower power settings, gas turbomachine 2 includes a throttling system 40 arranged in inlet system 20. Throttling system 40 selectively establishes a pressure drop within fluid flow zone 37 that is configured to match with operating parameters of gas turbomachine 2.

In accordance with one aspect of the exemplary embodiment illustrated in FIG. 2, throttling system 40 is arranged at inlet portion 30 and includes a plurality of louvers 44-49. Each louver 44-49 includes a corresponding center pivot 54-59. Center pivots 54-59 allow each louver 44-49 to rotate between a first, low pressure drop position 64 forming a substantially unrestricted inlet zone 65 having a plurality of fluid passages 67 as shown in FIG. 3, and a second, high pressure drop position 74 forming a substantially restricted inlet zone 75 having a plurality of fluid passages 77. Fluid passages 77 are substantially smaller than fluid passages 67. In this manner, when gas turbomachine 2 is operating in a full power mode, throttling system 40 is arranged in low pressure drop position 64 resulting in a nominal inlet pressure to compressor portion 4. However, during lower power operation, throttling system 40 can be shifted toward or to high pressure drop position 74 to reduce the inlet pressure to compressor portion 4. Reducing the inlet pressure to compressor portion 4 leads to an increase in combustion reference temperature and thus a reduction in emissions from gas turbomachine 2. At this point it should be understood, throttling system 40 can be arranged elsewhere in duct member 24. For example, a throttling system 40a having a plurality of louvers 44a-46a may be arranged along intermediate portion 34.

Figure 6:
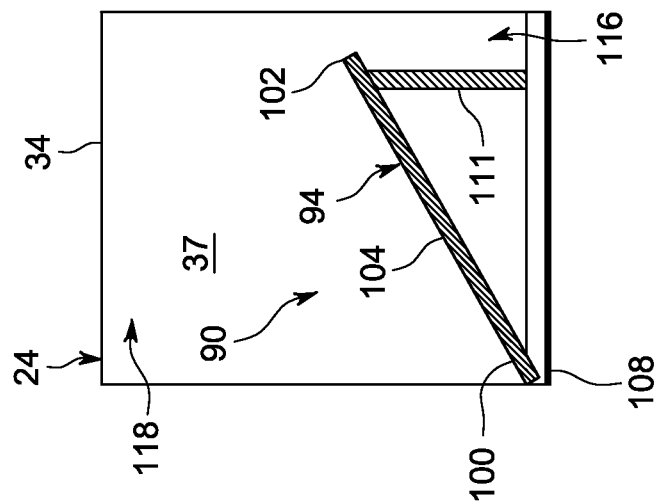
FIG. 6 is a side view of the throttling system of FIG. 5 shown in a second, high pressure drop position.
Figure 5:
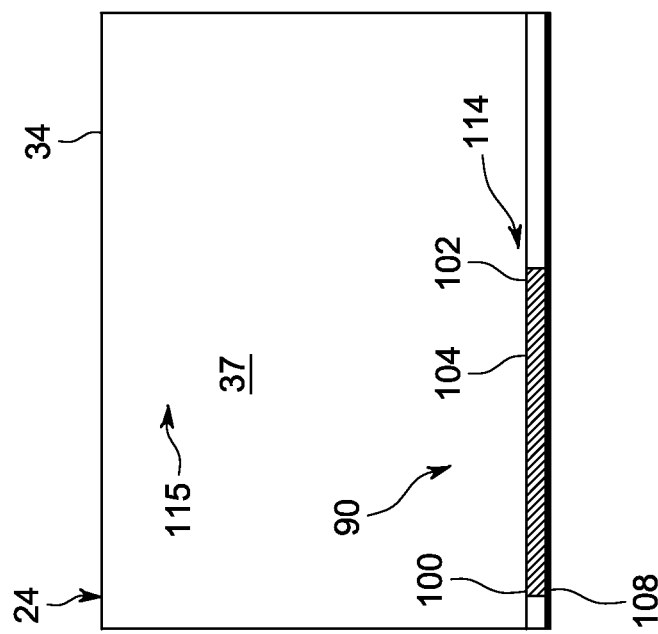
FIG. 5 is a side view of a throttling system in accordance with another aspect of the exemplary embodiment shown in a first, low pressure drop position.

Reference will now be made to FIGS. 5-6 in describing a throttling system 90 in accordance with another aspect of the exemplary embodiment. Throttling system 90 takes the form of a restrictor member 94 pivotally mounted within duct member 24. Restrictor member 94 includes a first end section 100 that extends to a second end section 102 through an intermediate section 104. First end section 100 defines a pivot axis 108 for restrictor member 94. An actuator member 111 is coupled to intermediation portion 104. Actuator member 111 selectively shifts restrictor member 94 between a first, low pressure drop position 114 (FIG. 5) that forms a substantially unrestricted flow path 115 and a second, high pressure drop position 116 (FIG. 6) that forms more restricted flow path 118. In a manner similar to that described above, when gas turbomachine 2 is operating in a full power mode, restrictor member 94 is arranged in in low pressure drop position 114 resulting in a nominal inlet pressure to compressor portion 4. When gas turbomachine 2 is operating in a lower power mode, restrictor member 94 is shifted toward or to high pressure drop position 116 to reduce the inlet pressure to compressor portion 4.

Figure 10:
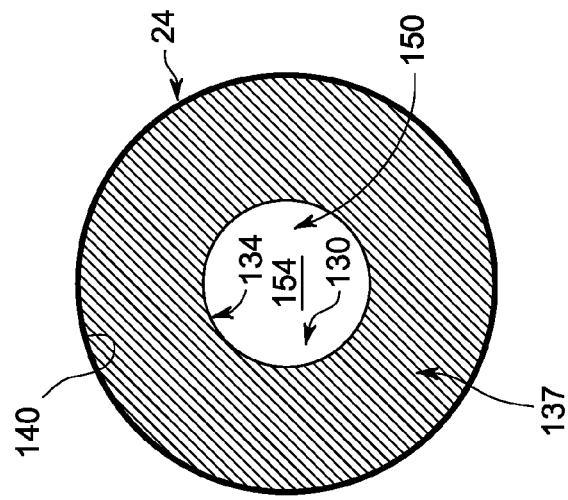
FIG. 10 is a plan view of the throttling system of FIG. 9.
Figure 9:
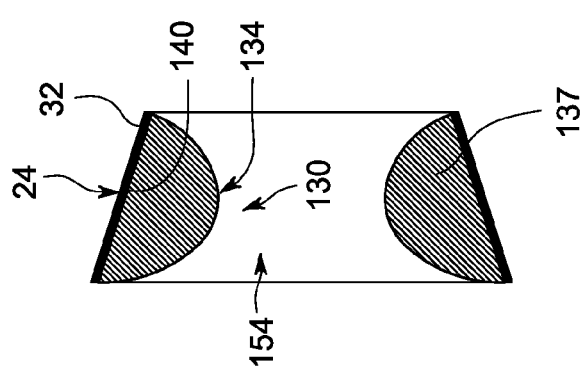
FIG. 9 is a side view of a throttling system of FIG. 7 shown in a second, high pressure drop position.
Figure 8:
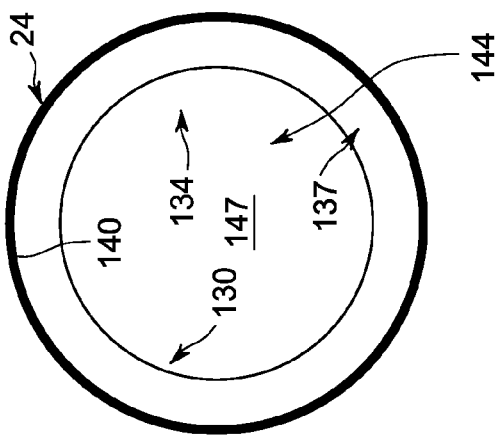
FIG. 8 is a plan view of the throttling system of FIG. 7.
Figure 7:
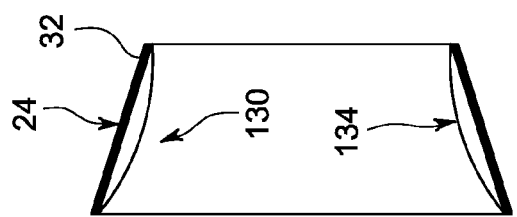
FIG. 7 is a side view of a throttling system in accordance with yet another aspect of the exemplary embodiment shown in a first, low pressure drop position.

FIGS. 7-10 illustrate a throttling system 130 in accordance with another aspect of the exemplary embodiment. Throttling system 130 includes a flow restriction device 134. Flow restriction device 134 takes the form of an inflatable flow restriction device or diaphragm 137 provided about an inner perimeter 140 of outlet portion 32. Inflatable diaphragm 137 is selectively inflatable between a first, low pressure drop position 144 forming a substantially unrestricted outlet zone 147 (FIGS. 7 and 8) and a second, high pressure drop position 150 forming a generally more restricted outlet zone 154 (FIGS. 9 and 10). In a manner similar to that described above, when gas turbomachine 2 is operating in a full power mode, inflatable diaphragm 137 is arranged in low pressure drop position 144 providing a nominal inlet pressure at compressor inlet 17. When gas turbomachine 2 is operating in a lower power mode, inflatable diaphragm 137 is filled with an amount of air to reduce the inlet pressure at compressor inlet 17.

In further accordance with an exemplary embodiment, inlet system 20 includes a controller 165 having a central processing unit (CPU) 167. Controller 165 is operatively coupled to a sensor 180 that detects emissions from gas turbomachine 2. Sensor 180 provides emissions data to controller 165, which is operatively connected to one or more of throttling systems 40, 40a, 90, and 130. When sensor 180 and CPU 167 indicate that gas turbomachine 2 is sufficiently near the emissions compliant limit, controller 165 selectively adjusts the one or more of throttling systems 40, 40a, 90 and 130 to reduce the inlet pressure at compressor inlet 17. At constant power, a reduction in inlet pressure results in elevated combustion temperatures and reduced emissions at the expense of higher fuel flow. However, the reduction in inlet pressure enables gas turbomachine 2 to be turned down to a lower power level to reduce fuel consumption relative to nominal operation and remain in emissions compliance. In this manner, the throttling systems in accordance with the exemplary embodiment expand an overall emissions compliant operational envelope of gas turbomachine 2. Thus, operators may run gas turbomachine 2 at lower outputs to save fuel without exceeding government mandated emissions levels.

In accordance with one aspect of the exemplary embodiment, gas turbomachine 2 may include a real time engine simulation model (RESM) 190 that is configured to calculate estimated emissions or an estimated combustion reference temperature based on operating conditions. Real time engine simulation model 190 provides controller 165 calculated emissions or a calculated combustion reference temperature as a surrogate for direct emissions measurements. When RESM 190 indicates that gas turbomachine 2 is sufficiently near the emissions compliant limit, controller 165 selectively adjusts the one or more of throttling systems 40, 40a, 90 and 130 to reduce the pressure supplied to compressor inlet 17. In accordance with another aspect of the exemplary embodiment, RESM 190 may operate in conjunction with direct emissions measurement from sensor 180 to further enhance operating efficiency of gas turbomachine 2.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A gas turbomachine inlet system, the gas turbomachine inlet system comprising a gas turbomachine that comprises a compressor, a turbine and a combustor, the gas turbomachine inlet system comprising:

a duct member having an inlet portion fluidically coupled to an outlet portion through an intermediate portion, the inlet portion, outlet portion and intermediate portion defining a fluid flow zone, the duct member being separate from the gas turbomachine and connected to the gas turbomachine at the compressor; and at least one throttling system arranged in the duct member at one of the inlet portion, outlet portion, and intermediate portion, the at least one throttling system being configured and disposed to selectively establish a pressure drop through the fluid flow zone, and one of the at least one throttling system includes an inflatable diaphragm.

2. The gas turbomachine inlet system according to claim 1, wherein the at least one throttling system further includes a plurality of louvers arranged at the inlet portion of the duct member, the plurality of louvers being configured to be selectively shiftable between a first, low pressure drop position that provides a substantially unrestricted inlet zone of the duct member and a second, high pressure drop position that provides a substantially restricted inlet zone of the duct member.

3. The gas turbomachine inlet system according to claim 2, wherein each of the plurality of louvers includes a center pivot defining a pivot axis.

4. The gas turbomachine inlet system according to claim 1, wherein the at least one throttling system further includes a plurality of louvers arranged at the intermediate portion of the duct member, the plurality of louvers being configured to be selectively shiftable between a first, low pressure drop position that provides a substantially unrestricted flow path through the intermediate portion and a second, high pressure drop position that provides a substantially restricted flow path through the intermediate portion.

5. The gas turbomachine inlet system according to claim 1, wherein the at least one throttling system further includes a restrictor member mounted along the intermediate portion of the duct member, the restrictor member being configured and disposed to be selectively shiftable between a first, low pressure drop position and a second, high pressure drop position.

6. The gas turbomachine inlet system according to claim 5, wherein the restrictor member includes a first end section that extends to a second end section, the first end section defining a pivot axis for the restrictor member.

7. The gas turbomachine inlet system according to claim 6, wherein the at least one throttling system includes an actuator member configured and disposed to pivot the restrictor member between the first and second position.

8. The gas turbomachine inlet system according to claim 1, wherein the inflatable diaphragm positioned at the outlet portion of the duct member, the flow restriction device being configured and disposed to move between a first, low pressure drop position that provides a substantially unrestricted outlet zone of the duct member and a second, high pressure drop position that provides a substantially restricted outlet zone of the duct member.

9. The gas turbomachine inlet system according to claim 8, wherein the inflatable diaphragm extends about an inner perimeter of the outlet portion of the duct member.

10. A method of controlling the inlet pressure drop through an inlet system for a gas turbomachine, the method comprising:
establishing an operating mode for the gas turbomachine; and
adjusting a throttling system provided in a duct member of the inlet system to control the inlet pressure to the gas turbomachine based on the operating mode;
wherein adjusting the throttling system includes selectively shifting a plurality of louvers arranged in the duct member between a first, low pressure drop position, and a second, high pressure drop position,
wherein adjusting the throttling system includes selectively shifting a restrictor member arranged in the duct member between a first, low pressure drop position, and a second, high pressure drop position; and
wherein adjusting the throttling system includes selectively inflating a flow restriction device arranged in the duct member between a first, low pressure drop position, and a second, high pressure drop position.

11. The method of claim 10, further comprising:
sensing exhaust emissions of the gas turbomachine operating in the operating mode; and
adjusting the throttling system based on the sensed exhaust emissions to reduce the exhaust emissions without changing the operating mode.

12. The method of claim 10, further comprising:
calculating one of an estimated gas turbomachine emissions and an estimated combustion reference temperature through a real time engine simulation model; and
adjusting the throttling system based on the one of the estimated gas turbomachine emissions and the estimated combustion reference temperature.

13. A gas turbomachine comprising:
a compressor portion having a compressor inlet;
a turbine portion mechanically coupled to the compressor portion;
a combustor assembly fluidically connected to the compressor portion and the turbine portion; and
an inlet system fluidically connected to the compressor inlet, the inlet system comprising:
a duct member having an inlet portion fluidically coupled to an outlet portion through an intermediate portion, the inlet portion, outlet portion, and intermediate portion defining a fluid flow zone, the duct member being separate from the gas turbomachine and connected to the gas turbomachine at the compressor; and
at least one throttling system arranged in the duct member at one of the inlet portion, outlet portion, and intermediate portion, the at least one throttling system being configured and disposed to selectively establish a pressure drop through the fluid flow zone, and one of the at least one throttling system includes an inflatable diaphragm.

14. The gas turbomachine according to claim 13, wherein the at least one throttling system further includes a plurality of louvers arranged at one of the inlet portion and the intermediate portion of the duct member, the plurality of louvers being configured to be selectively shiftable between a first, low pressure drop position that provides a substantially unrestricted inlet zone of the duct member and a second, high pressure drop position that provides a substantially restricted inlet zone of the duct member.

15. The gas turbomachine according to claim 13, wherein the at least one throttling system further includes a restrictor member mounted along the intermediate portion of the duct member, the restrictor member being configured and disposed to be selectively shiftable between a first, low pressure drop position and a second, high pressure drop position.

16. The gas turbomachine according to claim 13, wherein the inflatable diaphragm is positioned at the outlet portion of the duct member, the inflatable diaphragm being configured and disposed to move between a first, low pressure drop position that that provides a substantially unrestricted outlet zone of the duct member and a second, high pressure drop position that provides a substantially restricted outlet zone of the duct member.

17. A gas turbomachine inlet system, the gas turbomachine inlet system comprising a gas turbomachine that comprises a compressor, a turbine and a combustor, the gas turbomachine inlet system comprising:
- a duct member having an inlet portion fluidically coupled to an outlet portion through an intermediate portion, the inlet portion, outlet portion and intermediate portion defining a fluid flow zone, the duct member being separate from the gas turbomachine and connected to the gas turbomachine at the compressor; and
- a throttling system arranged in the duct member at one of the inlet portion, outlet portion, and intermediate portion, the throttling system being configured and disposed to selectively establish a pressure drop through the fluid flow zone;
- wherein the throttling system includes a plurality of louvers arranged at the inlet portion of the duct member, the plurality of louvers each of the plurality of louvers includes a center pivot defining a pivot axis and being configured to be selectively shiftable between a first, low pressure drop position that provides a substantially unrestricted inlet zone of the duct member and a second, high pressure drop position that provides a substantially restricted inlet zone of the duct member;
- wherein the throttling system includes a plurality of louvers arranged at the intermediate portion of the duct member, the plurality of louvers being configured to be selectively shiftable between a first, low pressure drop position that provides a substantially unrestricted flow path through the intermediate portion and a second, high pressure drop position that provides a substantially restricted flow path through the intermediate portion;
- wherein the throttling system includes a restrictor member mounted along the intermediate portion of the duct member, the restrictor member being configured and disposed to be selectively shiftable between a first, low pressure drop position and a second, high pressure drop position;
- wherein the throttling system includes a flow restriction device positioned at the outlet portion of the duct member, the flow restriction device being configured and disposed to move between a first, low pressure drop position that provides a substantially unrestricted outlet zone of the duct member and a second, high pressure drop position that provides a substantially restricted outlet zone of the duct member, the flow restriction device extends about an inner perimeter of the outlet portion of the duct member and the flow restriction device comprises an inflatable diaphragm.

* * * * *

UNITED STATES PATENT AND TRADEMARK OFFICE
CERTIFICATE OF CORRECTION

| | | |
|---|---|---|
| PATENT NO. | : 9,435,219 B2 | Page 1 of 1 |
| APPLICATION NO. | : 13/454533 | |
| DATED | : September 6, 2016 | |
| INVENTOR(S) | : Mullen et al. | |

It is certified that error appears in the above-identified patent and that said Letters Patent is hereby corrected as shown below:

In the Claims

In Column 6, Line 62, in Claim 16, delete "that that" and insert -- that --, therefor.

Signed and Sealed this
Twenty-ninth Day of November, 2016

Michelle K. Lee
*Director of the United States Patent and Trademark Office*